United States Patent
Wakao et al.

(10) Patent No.: US 6,268,669 B1
(45) Date of Patent: Jul. 31, 2001

(54) ELECTRIC MOTOR FOR POWER STEERING DEVICE

(75) Inventors: Hirokazu Wakao; Akira Endo; Takenobu Nakamura; Wataru Kawaguchi, all of Tokyo (JP)

(73) Assignee: Kayaba Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/509,497

(22) PCT Filed: Oct. 1, 1997

(86) PCT No.: PCT/JP97/03513

§ 371 Date: May 18, 2000

§ 102(e) Date: May 18, 2000

(87) PCT Pub. No.: WO99/16654

PCT Pub. Date: Apr. 8, 1999

(51) Int. Cl.[7] ....................................................... B62D 5/04
(52) U.S. Cl. .................. 310/67 R; 310/75 R; 310/68 B; 310/68 R; 310/DIG. 6; 310/89; 310/91; 180/443; 701/41
(58) Field of Search ..................................... 310/75 R, 89, 310/67 R, 90, 91, 68 R, DIG. 6, 68 B; 180/444, 443; 701/41

(56) References Cited

U.S. PATENT DOCUMENTS 5,536,972 * 7/1996 Kato ..................................... 257/706
5,686,780 * 11/1997 Adachi et al. ..................... 310/68 D
5,770,902 * 6/1998 Batten et al. ........................... 310/71
5,785,145 * 7/1998 Wakao et al. ......................... 180/443

FOREIGN PATENT DOCUMENTS

| 3-5570 | 1/1991 | (JP) . |
| 3-176270 | 7/1991 | (JP) . |
| 8-192757 | 7/1996 | (JP) . |
| 9-30434 | 2/1997 | (JP) . |
| 9-136652 | 5/1997 | (JP) . |

* cited by examiner

*Primary Examiner*—Burton S. Mullins
(74) *Attorney, Agent, or Firm*—Rabin & Champagne, P.C.

(57) ABSTRACT

An electric motor 10 for an electric power steering system, in which a board mounting portion 23 of aluminum for partitioning an electric motor body 10A and a circuit board 40 is formed all over the inner side of a motor case 20 and in which a bearing 25 of an output shaft 11 of the electric motor body 10A is supported on the board mounting portion 23 to release the heat effectively from FETs 43 mounted on the circuit board 40 and the output shaft 11. On the other hand, pigtail wires 36 from brushes 33 are welded to brush leads 27 having a wide surface area so that the circuit board 40 may be prevented from rising to a high temperature at the welding time. A torque limiter 80 is interposed between the output shaft 11 and a worm shaft 92 in a worm case 90 to reduce the size of the entire system, and the cogging of the motor torque is suppressed by correcting the feed current to the electric motor body 10A on the basis of the position changes in a plurality of slits 101 which are formed in the outer circumference of a case 81 of the torque limiter 80 and in phase with the electrodes of a commutator 35.

11 Claims, 17 Drawing Sheets

ELECTRIC MOTOR FOR POWER STEERING DEVICE

TECHNICAL FIELD

This invention relates to an improvement in an electric motor for an electric power steering system for applying an assisting force to a steering of the electric motor.

BACKGROUND ART

There has been known an electric power steering system for applying a proper assisting force to a steered member such as wheels from an electric motor in accordance with a torque in-putted from an input portion such as a steering wheel. The structure of the electric motor to be used in such electric power steering system has been proposed by us in Unexamined Published Japanese Patent Application No. 7-203888, for example.

FIG. 18 shows this electric motor of the electric power steering system of the prior art. As shown, an electric motor 201 is fixed in an assembling hole 204 which is formed in a wall 203 of a board case 202. In the case 202, a circuit board 205 is fitted to the wall 203. On this circuit board 205, a drive circuit comprising a plurality of FETs (Field Effect Transistors) 206 acting as switching elements for driving the electric motor 201, and a control circuit comprising a CPU 207 are installed.

An output shaft 210 extending from the electric motor 201 further extends through the assembling hole 204. It is supported on a cover 211 of the board case 202 via a bearing 212. And associated with a worm shaft 214 accommodated in a gear case 213. The worm shaft 214 is associated with a steered member, not shown, to transmit the assisting force from the electric motor 201 to the steered member.

Brushes 216 in sliding contact with a commutator 215 on the outer circumference of the output shaft 210 are held by brush holders 217, which are supported on an insulating spacer 218 mounted in the assembling hole 204. Pigtail wires (or lead wires) 219 for conducting the brushes 216 and the circuit board 205 are directly mounted on the circuit board 205.

The electric motor 201 of the prior art is thus constructed, but this structure has the following problems.

First of all, this electric motor 201 of the prior art cannot retain a sufficient heat releasing path from the plurality of FETs 206 composing the drive circuit and from the output shaft 210.

The plurality of FETs 206 composing the drive circuit on the circuit board 205 are usually arranged in the vicinity of the brushes 216, i.e., in the vicinity of the output shaft 210 from conveniences of the circuit construction. Since these FETs 206 generate heat the releasing path for this heat has to be retained. According to this prior art motor, however, the brushes 216 are located in the assembling hole 204 of the electric motor 201 and the FETs are also located in the vicinity of the hole 204, so the heat releasing path from the FETs 206 and the output shaft 210 is restricted to the path through the circuit board 205. Even if the board case 202 and the circuit board 205 are made of aluminum or the like having a high thermal conductivity, therefore, the heat release from the FETs 206 and the output shaft 210 may not be sufficient.

Secondly, this prior art motor has a problem that the temperature of the circuit board 205 becomes high when the pigtail wires 219 are fixed thereon. Specifically, the pigtail wires 219 extending from the brushes 216 are directly fixed on the circuit board 205, and this fixing operation is made by the hot-soldering or ultrasonic-welding work. As a result, the heat generated by this hot-soldering or ultrasonic-welding operation is hard to be released from the circuit board 205. In the worst case, the circuit pattern of the circuit board 205 may be separated by that heat.

Thirdly, this prior art motor is not convenient for carrying the dynamic characteristic tests of the electric motor 201 by itself. In this structure of the prior art motor, more specifically, the output shaft 210 of the electric motor 201 extends downward of the board case body 203 holding the circuit board 205 and it is supported on the cover 211 via the bearing 212. As a result, the dynamic characteristic tests of the electric motor 201 in the state detached from the case 202 have required a special jig for supporting the electric motor 201.

Fourthly, a torque limiter has to be provided for the electric motor 201. In this prior art motor, the torque limiter has to be arranged outside of the board case 202 which makes the structure of the entire system large-sized.

This invention has been conceived noting those problems and has an object to provide an electric motor for an electric power steering system, which has an excellent heat releasing property from the circuit board (especially, FETs composing the drive circuit) and the output shaft.

Another object of this invention is to provide an electric motor for an electric power steering system, which is not adversely affected by the high temperature of the circuit board at a step of electrically connecting the brushes and the circuit board of the electric motor.

Still another object of this invention is to provide an electric motor for an electric power steering system, in which the dynamic characteristic tests of the electric motor can be easily performed.

Still another object of this invention is to provide an electric motor for an electric power steering system, which can accommodate a torque limiter compactly in the electric motor thereby to reduce the size of the entire system.

DISCLOSURE OF THE INVENTION

This invention provides an electric motor for an electric power steering system for applying an assisting force to a member to be steered, in accordance with an input torque inputted to an input member. The motor comprises a motor case for accommodating an electric motor body and a circuit board on which a drive circuit for driving the electric motor body and a control circuit for controlling the drive circuit are installed, and a board mounting member formed across an inner space of the motor case as a wall partitioning the electric motor body and the board. The board mounting member is made of a material having a high thermal conductivity and supports a bearing of an output shaft of the electric motor body which projects through the board mounting member toward the board.

Even if the parts mounted on the board is caused to generate the heat by the drive of the electric motor, this heat is smoothly released through the board mounting member, because the entire circuit board is in contact with the board mounting member. As a result, the stability of the operation of the circuits on the circuit board is ensured. Since the bearing of the output shaft is supported on the board mounting member, the heat of the output shaft is also smoothly released via the board mounting member. Especially when the drive circuit employs the field effect transistors as the switching elements, the heat from the field effect transistors is effectively released via the board mounting member, so the field effect transistors do not easily reach the junction temperature and the operation performance of the drive circuit is maintained stable. Moreover, the output shaft of the electric motor body is supported by the board mounting member 23 via the bearing, so the dynamic characteristic tests of the electric motor in a state detached from the board case can be executed without supporting the electric motor with a special jig, and the tests can be executed more efficiently.

According to an aspect of this invention, the motor further comprises a brush lead extending from a brush in sliding contact with a commutator of the electric motor body to the circuit board through the board mounting member. The brush lead has a wide surface area on the side of the brush. An ECU lead extending from the circuit board is connected electrically with the brush lead, and a lead wire extending from the brush is welded to a part corresponding to the wide surface area of the brush lead. As a result, the high heat generated at the time of welding the lead wire is efficiently released through the wide surface area of the brush lead and does not reach the circuit board directly. Therefore, the circuit board is not heated to a high temperature when the lead is welded, and therefore, the welding of the lead does not adversely affect the circuit board.

According to another aspect of this invention, in the invention, the brush lead and the ECU lead are retained together at a predetermined position by a conductive fixing spring. As a result, even if the solders between the brush lead and the ECU lead is melted with the heat due to power supply, the electric contact between the brush leads and the ECU leads are reliably held by the conductive fixing springs to retain the proper operations of the electric motor.

According to yet another aspect of this invention, the motor further comprises a lower case covering a lower side of the circuit board, and a torque limiter interposed between the output shaft of the electric motor body and a rotary shaft associated with the steered member. The torque limiter is accommodated in the lower case below the circuit board. As a result, the spaces in the motor case and the lower case are effectively utilized so that the power steering system including the torque limiter can be entirely small-sized in structure to improve its mountability on the vehicle.

According to yet another aspect of this invention, the torque limiter, the output shaft of the electric motor body and the rotary shaft are connected so that the outer circumference of the torque limiter rotates together with the output shaft. The motor further comprises a plurality of slits formed in the outer circumference of the torque limiter with the same number of and in phase with a plurality of electrodes of a commutator of the electric motor body, and detection means arranged on the side of the torque limiter for detecting position changes in the slits according to the rotation of the output shaft. A command value of a feed current to the electric motor body is then corrected on the basis of the position changes in the slits. The contacting states between the plurality of electrodes of the commutator on the outer circumference of the output shaft and the brushes fluctuate with the rotation of the output shaft, and the cogging (or periodic fluctuation) of the output torque of the motor, as caused by the influences on the feed current to the electric motor body can be stabilized to a substantially constant level, by giving the feed current command value the correction to compensate the fluctuation of the cogging of the output torque of the motor, that is, the fluctuation of the actual feed current to the electric motor body.

According to yet another aspect of this invention, the detection means extends downward from the board to the side of the torque limiter. The detecting means can then be connected with the circuit board at a reduced number of wiring steps and easily disposed on the side of the torque limiter.

According to yet another aspect of this invention, the torque limiter, the output shaft and the rotary shaft are connected so that the outer circumference of the torque limiter rotates together with the rotary shaft. The electric motor further comprises a plurality of slits formed in the outer circumference of the torque limiter, detection means arranged on the side of the torque limiter for detecting a rotation speed of the rotary shaft via the position changes in the slits, and detection means for detecting the rotation speed of the output shaft. A slip between the output shaft and the rotary shaft is determined in terms of an inconsistency between the detected rotating speed of the rotary shaft and the detected rotating speed of the output shaft. The slip can be easily decided by comparing the numbers of revolutions of the output shaft and the rotary shaft. If the number of revolutions of the output shaft is larger than that of the rotary shaft, it is determined that the feed current to the electric motor is so excessive as to cause the slip. If the number of revolutions of the rotary shaft is larger than that of the output shaft, it is determined that the slip is caused by the external force applied to the steered portion. Thus, the causes for the slips can be properly assessed.

According to yet another aspect of this invention, a feed current to the electric motor body is reduced, when the detected rotating speed of the output shaft is higher than that of the rotary shaft, whereas the feed current to the electric motor body is gradually increased when the rotating speed of the output shaft, as detected again, is coincident with that of the rotary shaft. Due to this construction, the slip between the output shaft and the rotary shaft caused by the excessive feed current to the electric motor body can be instantly eliminated. After the slip has been stopped, the sufficient current can be again fed to the electric motor at a proper timing so that the functions of the electric power steering system are maintained.

According to yet another aspect of this invention, a detecting member of the detection means for detecting the rotating speed of the rotary shaft extends downward from the board to the side of the torque limiter. The detection means can be connected with the board at a reduced number of wiring steps and can be easily disposed on the side of the torque limiter.

According to yet another aspect of this invention, the drive circuit comprises a plurality of field effect transistors, the board is composed of two boards, one of which is a heat releasing board made of a material having a high thermal conductivity, and the plurality of field effect transistors are mounted on the heat releasing board. Due to this construction, the cost for the entire board can be lowered, and the heat from the exothermic field effect transistors can be effectively released.

According to yet another aspect of this invention, the drive circuit comprises a plurality of field effect transistors as switching elements, the electric motor comprises a lower case for covering the lower side of the board, and the lower case has ribs for enclosing the plurality of field effect transistors. The noises accompanying the switching operations of the field effect transistors are shielded from the control circuit by the ribs so that they exert no influence upon the control circuit.

According to yet another aspect of this invention, the drive circuit comprises a plurality of field effect transistors as switching elements, and the motor case has ribs for enclosing the plurality of field effect transistors. The noises accompanying the switching operations of the field effect transistors are shielded from the control circuit by the ribs so that they exert no influence upon the control circuit.

BEST MODE FOR CARRYING OUT THE INVENTION

This invention will now be described in more detail with reference to the accompanied drawings.

Figure 1:
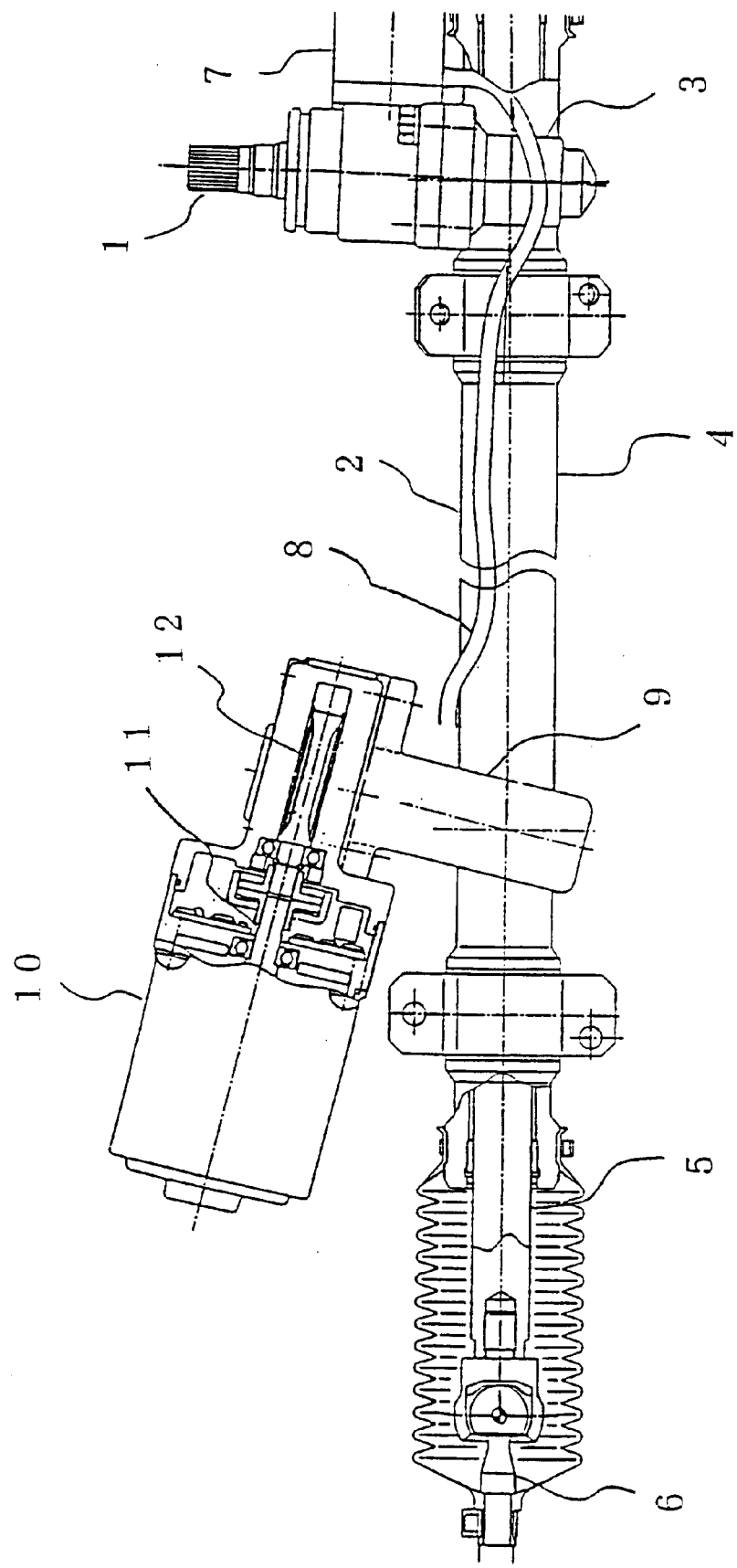
FIG. 1 is a diagram showing the entire construction of a power steering system according to this invention.

FIG. 1 shows the entire construction of a power steering system according to this invention.

An input shaft 1, to which a torque is inputted from an input member (e.g., a steering wheel), is connected in a pinion accommodating portion 3 of a gear case 2 to a pinion shaft through a torsion bar, not shown. The pinion formed on the pinion shaft meshes with a rack shaft 5 accommodated in a rack shaft accommodating portion 4 of the gear case 2, so that the rack shaft 5 slides as the pinion is rotated by the input torque. To the rack shaft 5, there is connected through a knuckle arm 6 a member to be steered (e.g., wheels), which is steered according to the sliding motion of that rack shaft 5.

On the other hand, the input torque is detected in terms of a torsion of the torsion bar by a torque sensor 7, the detection signal of which is inputted through a cable 8 to an electric motor 10 for power assisting. This electric motor 10 generates an output power based on the direction and magnitude of the detection signal of the input torque. This motor output power is transmitted to the rack shaft 5 through a worm 12 connected to the output shaft 11 of the electric motor 10, a worm wheel integrated with an assist pinion shaft, and the assist pinion of the assist pinion shaft, so that it applies the steering assisting force in the same direction as that of the input shaft 1. The assist pinion shaft is accommodated in an assist pinion accommodating portion 9 of the gear case 2.

Figure 2:
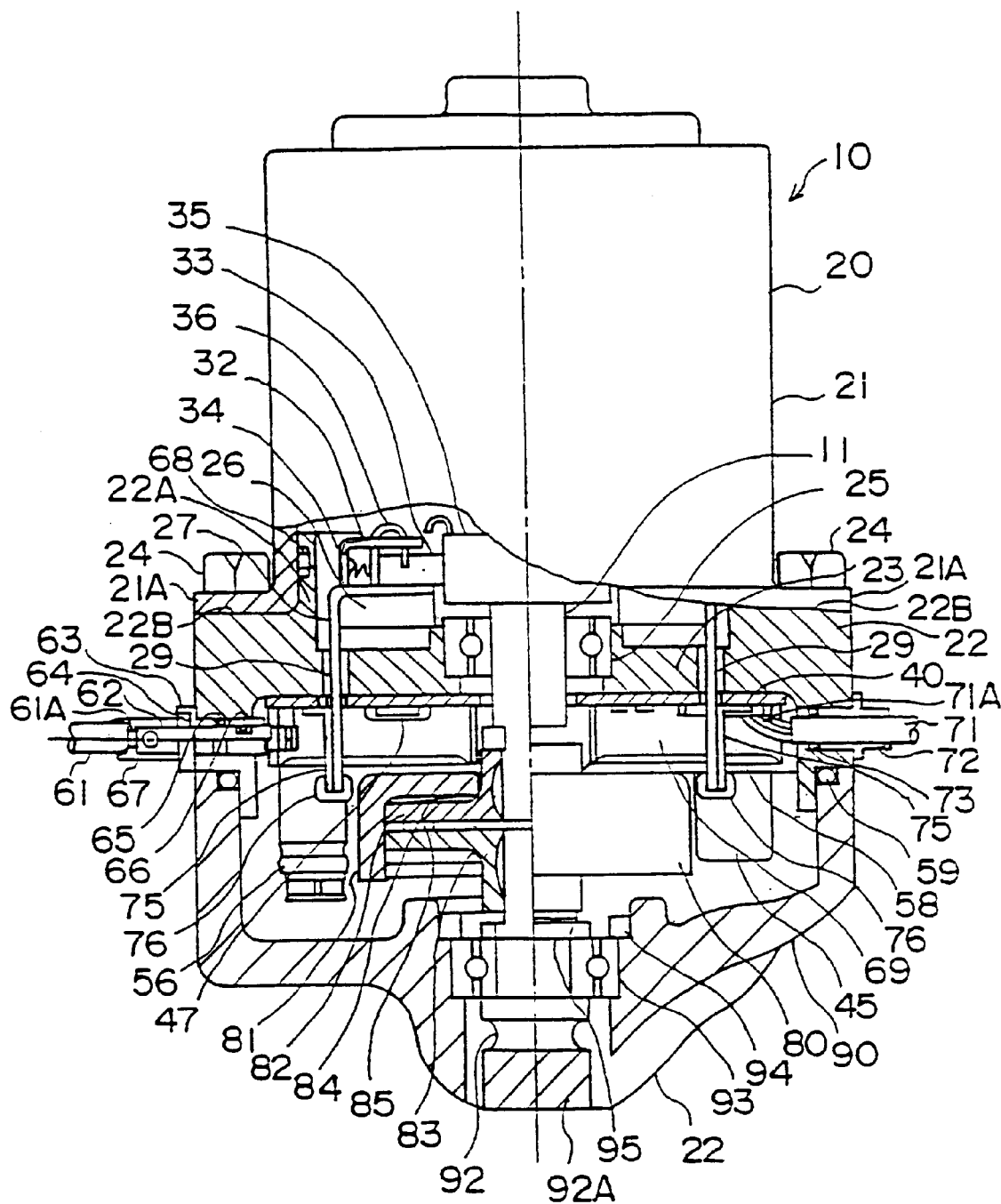
FIG. 2 is a longitudinal sectional view of an electric motor according to this invention.

FIG. 2 shows the electric motor 10 in more detail. The electric motor 10 has a motor case 20 constructed to include a motor body case 21 and a board case 22. More specifically, the board case 22 is jointed to the lower side of the motor body case 21 by inserting a fitted portion 22A at the upper end of the board case 22 in the inner circumference of the lower end of the motor body case 21 and by fastening a step portion 22B formed on the side of the fitted portion 22A and a flange portion 21A at the lower end of the motor body side case 21 by means of bolts 24. To the lower end of the board case 22, on the other hand, there is jointed the upper end of a worm case (or lower case) 90 to close the bottom of the motor case 20. An O-ring 68 is gripped between the inner circumference of the lower end of the motor body side case 21 and the fitted portion 22A of the board case 22, and an O-ring 69 is gripped between the board case 22 and the worm case 90, so that the motor case 20 may be made water-proof and dust-proof.

In the motor body case 21, there is accommodated an electric motor body 10A which is composed of magnetic poles, rotor and so on and which has its output shaft 11 extended downward. This output shaft 11 is extended through a board mounting member 23 formed in the board case 22 and is supported by a bearing 25 mounted in that board mounting member 23. Here in this invention, the board case 22 including the board mounting member 23, on which a circuit board 40 is mounted, is made of a material having a high thermal conductivity (e.g., aluminum). As a result, the heat to be generated by the drive of the electric motor 10 is effectively released through the board mounting member 23.

Figure 3:
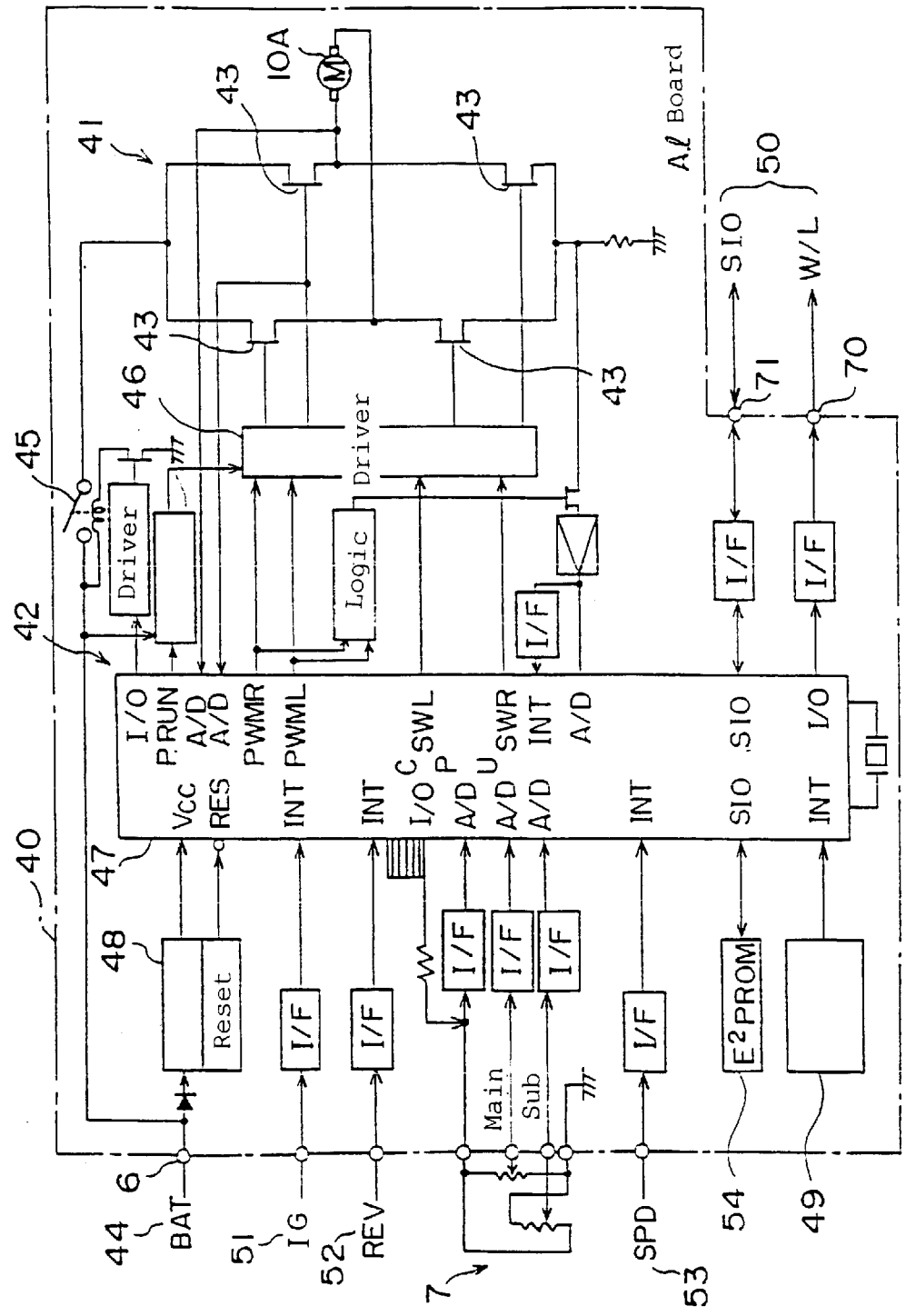
FIG. 3 is a circuit diagram showing a drive circuit and a control circuit for the electric motor of the invention.

This board mounting member 23 is made to cover all over the inner side of the board case 22 for separating the electric motor body 10A and the circuit board 40 of the electric motor 10, and mounts the circuit board 40 on its lower face (i.e., the face opposed to the electric motor body 10A). In this circuit board 40, there are assembled a drive circuit 41 and a control circuit 42 for the electric motor 10, as shown in the circuit diagram in FIG. 3.

The drive circuit 41 is composed of four FETs (Field Effect Transistors) 43 interposed between a battery 44 and the electric motor body 10A. These FETs 43 are switched on and off by the control circuit 42. As a result, the electric current fed from the battery 44 to the electric motor body 10A through a battery terminal 61 and a relay 45 is modulated in its pulse width. The output power of the electric motor body 10A varies according to this current. The relay 45 is turned OFF to interrupt the power supply to the electric motor body 10A when a later-described CPU 47 determines that any of the input torque detection signal from the torque sensor 7, an engine speed detection signal and a vehicle speed detection signal is abnormal.

The control circuit 42 controls the drive circuit 41 and is composed of a driver 46 for switching ON/OFF the individual FETs 43 of the drive circuit 41, and the CPU 47 for controlling the driver 46. This CPU 47 receives the input torque detection signal from the torque sensor 7 and controls the driver 46 on the basis of the received signal so that the output (i.e., the assisting force to the steered side) of the electric motor 10 is controlled to a proper level according to the input torque.

The voltage from the battery 44 is lowered and stabilized and inputted to the CPU 47, by a stabilizing power source 48. The speed detection signal of the electric motor 10 is fed back from a motor speed detecting circuit 49 to the CPU 47. An external signal 50 from a pair of signal terminals 71 is inputted to the CPU 47 as well as a signal 51 from an ignition switch, an engine speed detection signal 52 and a vehicle speed signal 53. The CPU 47 is provided with EEPROM (Electrical Erasable Programmable Read Only Memory) storing various data.

Figure 4:
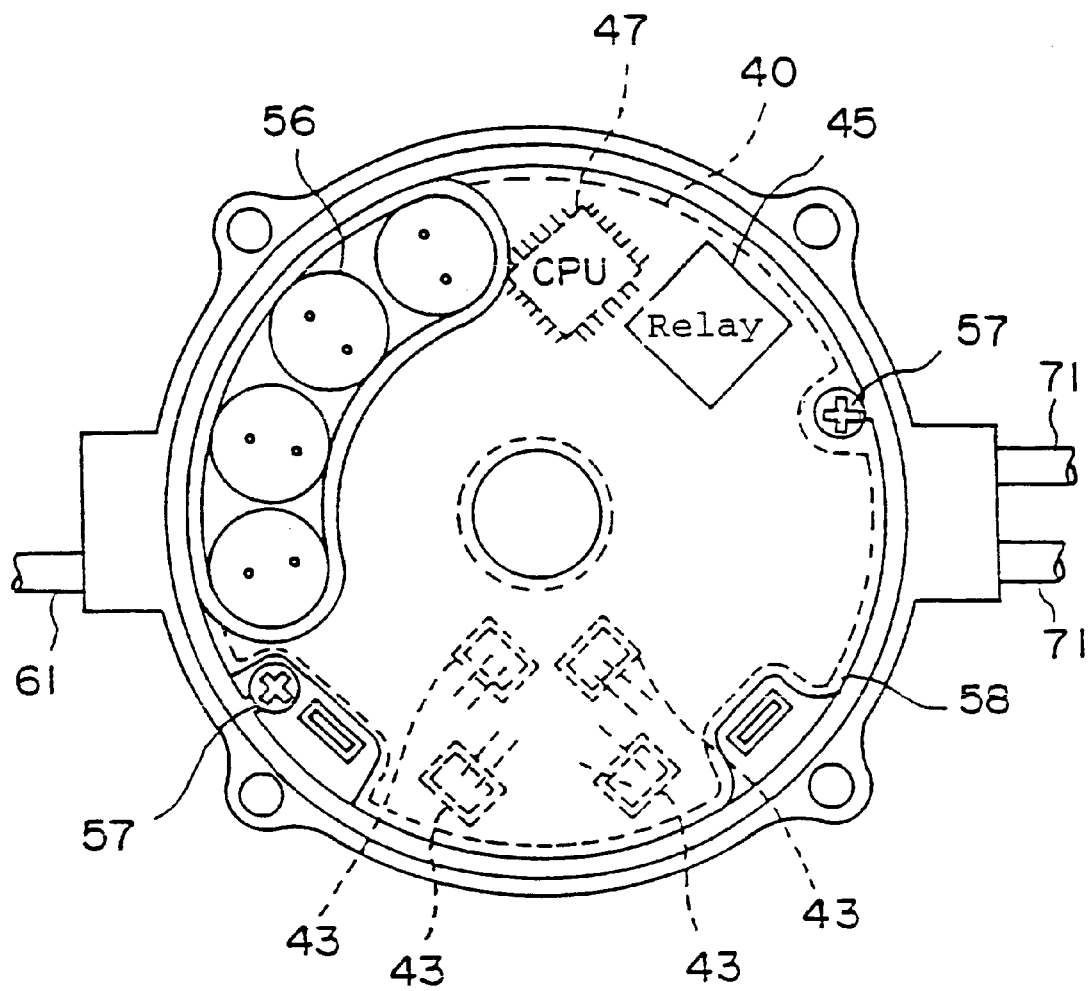
FIG. 4 is a plan view of a circuit board portion of the electric motor according to this invention.

Referring to FIGS. 2 and 4, the circuit components such as the CPU 47, the plurality of (or four in this embodiment) FETs 43 and a plurality of electric capacitors 56 are mounted downward on the circuit board 40. By thus mounting the electrolytic capacitors 56 reversely, the corrosion can be prevented even when the electrolyte leaks.

Moreover, the circuit board 40 is covered at its lower side with a cover 58 by means of screws 57, and the relay 45 is mounted on the cover 58. The clearance between the cover 58 and the circuit board 40 is filled with a gel 59.

Of the parts thus mounted on the circuit board 40, the FETs 43 are especially liable to generate much heat, and it is necessary to retain a heat releasing path. According to this invention, however, the board mounting member 23 is made of aluminum or the like having a high heat releasing effect, and the bearing 25 of the output shaft 11 is supported by the board mounting member 23, as described above. As a result, the board mounting member 23 can be held in contact with the whole face of the circuit board 40 so that the heat release from the motor driving FETs 43 can be effectively made even if the FETs 43 are arranged close to a brush 33 (i.e., the output shaft 11).

The battery terminal 61 is connected with the circuit pattern of the circuit board 40 through a terminal shaft 62 having a bonded electrode. The terminal shaft 62 is fixed by a snap ring 64 in a cylindrical insulating sleeve 63 which penetrates the side wall of the board case 22. An O-ring 65 is gripped between the sleeve 63 and the board case 22, and an O-ring 66 is gripped between the sleeve 63 and the terminal shaft 62, thereby making the inside of the motor case 20 water-proof and dust-proof. The protrusion of the terminal shaft 62 from the board case 22 is covered with a tube 67 to make it water-proof.

Figure 5:
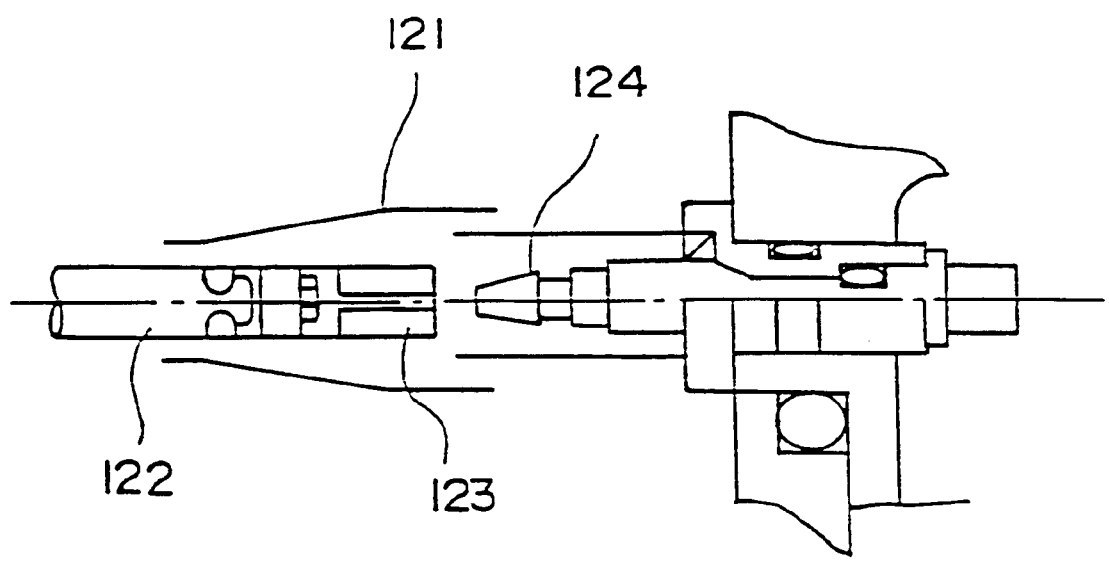
FIG. 5 is a longitudinal sectional view of a connector type battery terminal of the electric motor according to this invention.

The battery terminal may be of the connector type, which is composed of a female terminal 123 of a battery wire 122 covered with a housing 121 and a male terminal 124 on the side of the electric motor 10, as shown in FIG. 5. This makes it possible to reduce the number of steps of mounting the battery terminal on the vehicle.

A pair of signal terminals 71 are respectively fixed in a cylindrical insulator 72 penetrating the side wall of the board case 22 on the opposite side of the battery terminal 61, and their electrodes are directly soldered to the circuit pattern of the circuit board 40. Between this insulator 72 and the board case 22, an O-ring 73 is gripped for making the inside of the motor case 20 water-proof and dust-proof.

Figure 6:
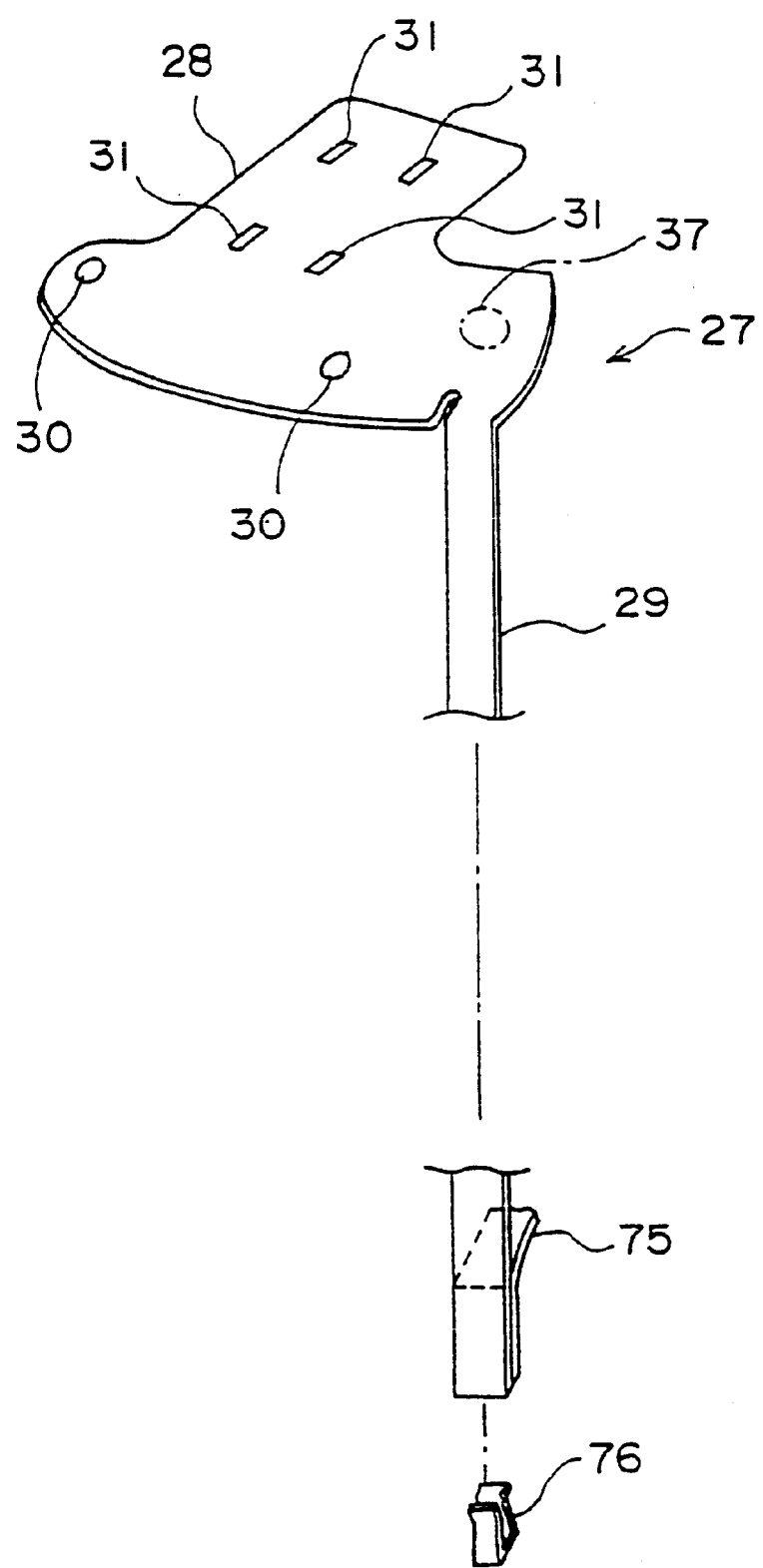
FIG. 6 is a perspective view of a brush lead of the electric motor according to this invention.

Over the board mounting member 23, there are disposed a pair of guides 26 made of resin, which are opposed to each other across the output shaft 11. The brush leads 27 made of low electric resistance material are held on these guides 26. Each of these brush leads 27 comprises as also shown in FIG. 6, a brush setting portion 28 and a lead portion 29 extending downward from the brush setting portion 28. This lead portion 29 penetrates the circuit board 40 and is soldered and fixed in contact with a conductive ECU lead 75 (as should be referred to FIG. 2) extending downward from the circuit board 40. Further, the leading portion 29 and ECU lead 75 are held together by a conductive fixing spring 76. Thus, the conduction between the commutator 35 and the drive circuit 41 of the circuit board 40 is made through the brush 33, the brush lead 27 and the ECU lead 75. Since the brush lead 27 and the ECU lead 75 are retained by the conductive fixing spring 76, the conduction between the brush lead 27 and the ECU lead 75 is continuously kept even if the solder in-between is melted with the heat which is generated by the drive of the electric motor 10.

In the brush setting portion 28, on the other hand, there are formed a pair of fixing holes 30, in which the brush lead 27 is positioned and fixed on the guides 26. In the brush setting portion 28, on the other hand, there are formed a plurality of brush holder fixing holes 31, in which a brush holder 32 is inserted and fixed at its leg portions.

In the brush holder 32, as shown in FIG. 2, the brush 33 and a coil spring 34 are accommodated. The brush 33 is pushed toward a commutator 35 disposed on the output shaft 11 and is held in contact with the commutator 35 by the coil spring 34.

The brush 33 and the brush lead 27 are connected through a pigtail wire (or lead wire) 36. In this case, the pigtail wire 36 is fixed on the brush lead 27 by hot-soldering or ultrasonic-welding it to a pigtail wire fixing position 37 (as should be referred to FIG. 6) of the brush setting portion 28 of the brush lead 27. As a result, the heat to be generated at the time of fixing the pigtail wire 36 is released from the brush setting portion 28 having a wide surface area so that the brush lead 27 and the circuit board 40 do not rise to a high temperature.

The output shaft 11 penetrating the circuit board 40 is spline jointed to a torque limiter 80 through a crowning spline, not shown, in the worm case 90. According to this invention, the torque limiter 80 is thus accommodated in the worm case (or lower case) 90 so that the vacant spaces in the motor case 20 and the worm case 90 can be effectively utilized to reduce the size of the entire system.

This torque limiter 80 is jointed to a worm shaft 92 having a worm 92A formed in its outer circumference. This worm shaft 92 is extended, while being supported by a bearing 93, to the outside of the worm case 90 and is associated with the rack shaft 5 shown in FIG. 1. The bearing 93 is fixed in the board case 22 by clamps 94 and 95.

The torque limiter 80 is equipped in a cylindrical case 81 with an upper clutch disc 82 and a lower clutch disc 83, of which the upper clutch disc 82 is connected to the output shaft 11 of the electric motor 10 whereas the lower clutch disc 83 is connected to the worm shaft 92. Moreover, the upper clutch disc 82 is urged toward the lower clutch disc 83 by a spring 84. As a result, the upper clutch disc 82 and the lower clutch disc 83 (i.e., the output shaft 11 and the worm shaft 92) are rotated together the frictional force generated between a friction member 85 fixed on the lower clutch disc 83 and the upper clutch disc 82, as long as the transmission torque between the output shaft 11 and the worm shaft 92 is less than a predetermined limit value. When the transmission torque between the output shaft 11 and the worm shaft 92 exceeds the predetermined limit value, the friction member 85 fixed on the lower clutch disc 83 and the upper clutch disc 82 slip, thereby preventing the electric motor 10 from being overloaded. The case 81 of the torque limiter 80 is made to rotate together with the upper clutch disc 82.

Figure 9:
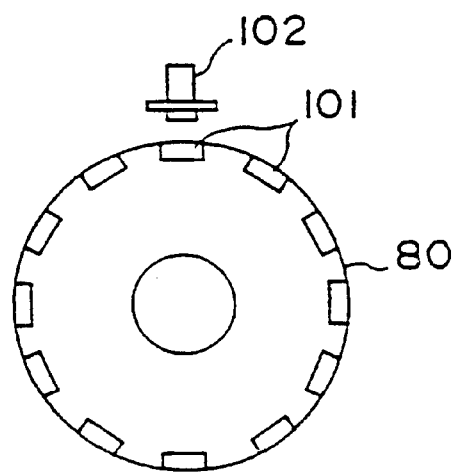
FIG. 9 is a plan view of a torque limiter and a HALLIC provided to the electric motor according to this invention.

According to this invention, moreover, there are formed in the outer circumference of the case 81 of the torque limiter 80 the same number of slits 101 as that (e.g., twelve in this embodiment) of the commutator 35 such that the slits 101 and the individual electrode of the commutator 35 are arranged in phase. On the side of the torque limiter 80, moreover, there is disposed (as should be referred to FIG. 9) a HALLIC 102 which acts as a rotational angle sensor of the torque limiter 80 (i.e., the output shaft 11) for detecting a change in the magnetic flux, as caused with a change in the positions of the slits 101 by the rotation of the torque limiter 80. This HALLIC 102 is disposed at an extension 103 of the circuit board 40. As a result, the HALLIC 102 can be easily disposed by a reduced number of wiring steps on the side of the torque limiter 80.

With this construction, the cogging (i.e., periodic fluctuation) in the torque of the electric motor 10 can be reduced, as will be described in detail.

Figure 8:
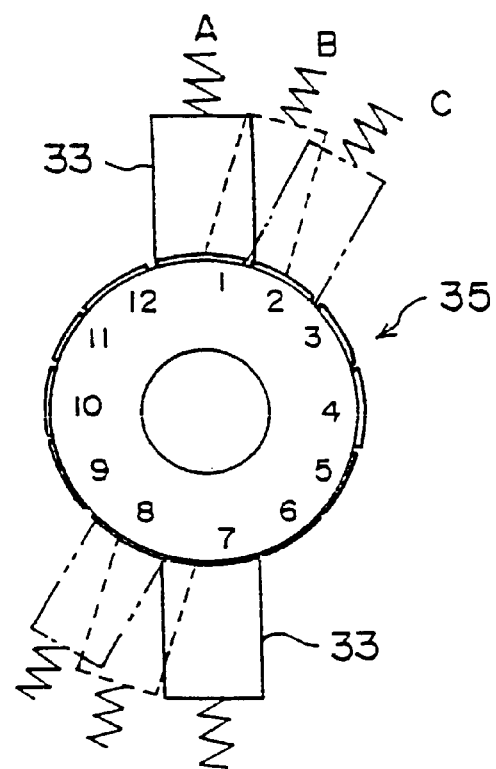
FIG. 8 is a plan view of a commutator electrodes and brushes of the electric motor according to this invention.
Figure 10:
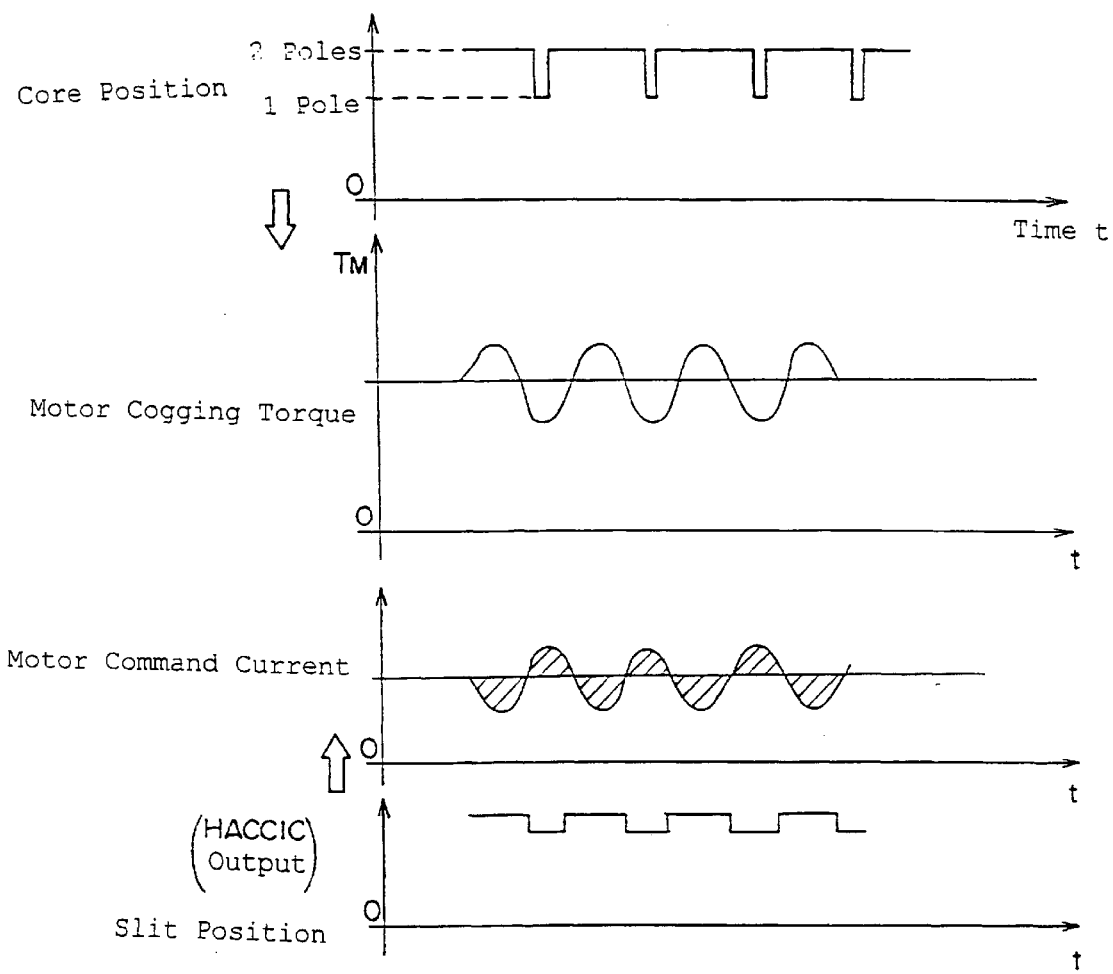
FIG. 10 is timing charts illustrating a relation between a rotational position of a commutator, a motor torque, and a relation between a slit position of the torque limiter and a motor command current.

As shown in FIG. 8, a pair of 33 contact with the commutator 35 while holding it from the two sides. They change the positions with respect to the electrodes composing the commutator 35 as the commutator 35 (or the output shaft 11) rotates. In this case, the brush 33 may be arranged to ride on two electrodes, as shown by broken lines at position B in FIG. 8, and to ride on one electrode, as shown by solid lines or two-dotted lines at position A or C in FIG. 8. These circumstances are illustrated in FIG. 10. The first graph in the figure illustrates that the one-pole and two-pole contact between the brush 33 and the commutator 35 appear in a repeated manner. By the influences of a higher motor driving current flow through the electric motor 10 in the two-pole contact case than in the one-pole contact case and the motor brush noise caused when the brush 33 moves between the electrodes, the current actually fed to the electric motor body 10A, that is, the output torque of the electric motor 10 causes the periodic fluctuation, as illustrated in the second graph in FIG. 10, even if a constant current is commanded by a motor current command, i.e., a command of an electric current to be fed to the electric motor 10.

As illustrated in the fourth graph in FIG. 10, the presence of the slits 101 in the outer circumference of the torque limiter 80 is periodically detected as the fluctuation (or drop) in the output of the HALLIC 102. Here, the slit positions of the torque limiter 80 correspond to the positions of the electrodes of the commutator 35 so that the detection timings of the slit positions is identical to that of the aforementioned cogging of the output torque of the electric motor 10. As illustrated in the third graph in FIG. 10, therefore, the control circuit 42 is enabled to compensate the periodic fluctuation of the current actually fed to the electric motor body 10A due to the presence of the electrodes of the commutator 35, by applying a correction to the motor current command synchronous with the detection timings of the slit positions, as hatched in the graph. More specifically, the actual output torque (i.e., the electric current to be actually fed to the electric motor body 10A) can be stabilized to a substantially constant level, by applying the correction to the motor current command to compensate the periodic fluctuation of the fed current in synchronism with the cogging period of the output torque of the electric motor 10.

Now the operation of this motor will be described.

When the torque is inputted from the input member (i.e., the steering wheel), this input torque is transmitted to the rack shaft 5 in the gear case 2 to steer the steered member (i.e., the wheels) through the knuckle arm 6. On the other hand, the input torque is detected by the torque sensor 7, and its detection value is inputted to the control circuit 42 of the electric motor 10. In accordance with this detection value, the control circuit 42 generates the command value (i.e., the motor current command) of the feed current to the electric motor body 10A thereby to control the switching operation of the drive circuit 41 in accordance with that motor current command. And the electric motor 10, as activated by the feed current from the drive circuit 41, applies the assisting force to the steering force to achieve the proper power assist according to the magnitude of the input torque.

According to this invention, the circuit board 40 having such drive circuit 41 and control circuit 42 packaged therein is assembled integrally with the electric motor body 10A in the motor case 20 thereby to reduce the size of the electric motor 10 and to improve its mountability on the vehicle.

Here, the drive circuit 41 comprises the plurality of FETs (Field Effect Transistors) 43 acting as the switching elements. These FETs 43 generate the heat by the switching operations, and the output shaft 11 of the electric motor 10 is also caused to generate the heat by the motor drive. It is, therefore, necessary to release those heats effectively. According to this invention, the heats from the FETs 43 and the output shaft 11 are smoothly released through the board mounting member 23. Specifically, the board mounting member 23 is so provided all over the inner circumference of the board case 22 while separating the electric motor body 10A and the circuit board 40 as to support the bearing 25 of the electric motor body 10A and is made of a material having a high thermal conductivity (e.g., aluminum). Even if the FETs 43 are arranged in the vicinity of the brushes 33 (i.e., in the vicinity of the output shaft 11) from the conveniences of the circuit construction, the circuit board 40 is in contact with the board mounting member 23 even in the arranged positions of the FETs 43 which is close to the output shaft 11, so that the heat from the FETs 43 is smoothly released through the board mounting member 23. On the other hand, the heat from the output shaft 11 is likewise effectively released through the board mounting member 23. Thus, according to this invention, the operating performances of the drive circuit 41 are held stable by preventing the FETs 43 from rising to a high temperature and from reaching a junction temperature easily.

According to this invention, the pigtail wires 36 for connecting the brushes 33 and the circuit of the circuit board 40 are fixed on the brushes 33 by welding the brush leads 27 on the pigtail wire fixing positions 37, and the heat at this time is released to the brush setting portions 28 through the brush leads 27 having a wide surface area so that the circuit board 40 is not overheated by fixing the pigtail wires 36.

The brush leads 27 are soldered to the ECU leads 75 extending from the circuit board 40 and are reluctant to generate heat even when powered, because they have a wide surface area in the brush setting portions 28 and a low electric resistance. Even if the solders between the brush leads 27 and the ECU leads 75 are melted with the heat of the power, the brush leads 27 and the ECU leads 75 are still fixed by the conductive fixing springs 76 so that their electric contacts are reliably held to retain the proper operations of the electric motor 10.

Since the electric motor body 10A is held above the board mounting member 23 via the bearing 25, the dynamic characteristic tests of the electric motor body 10A in the state detached from the board case 22 can be executed without supporting it with a special jig. Therefore, the tests can be made easily.

According to this invention, moreover, the torque limiter 80 interposed between the output shaft 11 and the worm shaft 92 is accommodated in the worm case 90 below the circuit board 40 so that the spaces in the motor case 20 and the worm case 90 are effectively utilized. As a result, the power steering system including the torque limiter 80 can be entirely small-sized in structure to improve its mountability on the vehicle.

The slits 101 in the outer circumference of the case 81 of the torque limiter 80 are arranged of the same number and in phase with the electrodes of the commutator 35, and the HALLIC 102 for detecting the movement of those slits 101 is so arranged on the side of the torque limiter 80 as to extend from the circuit board 40. Therefore, the cogging of the output torque (or the electric current to be actually fed to the electric motor body 10A) of the motor can be reduced by correcting the motor current command in synchronism with the detection timings of the slits 101 by the HALLIC 102.

Figure 11:
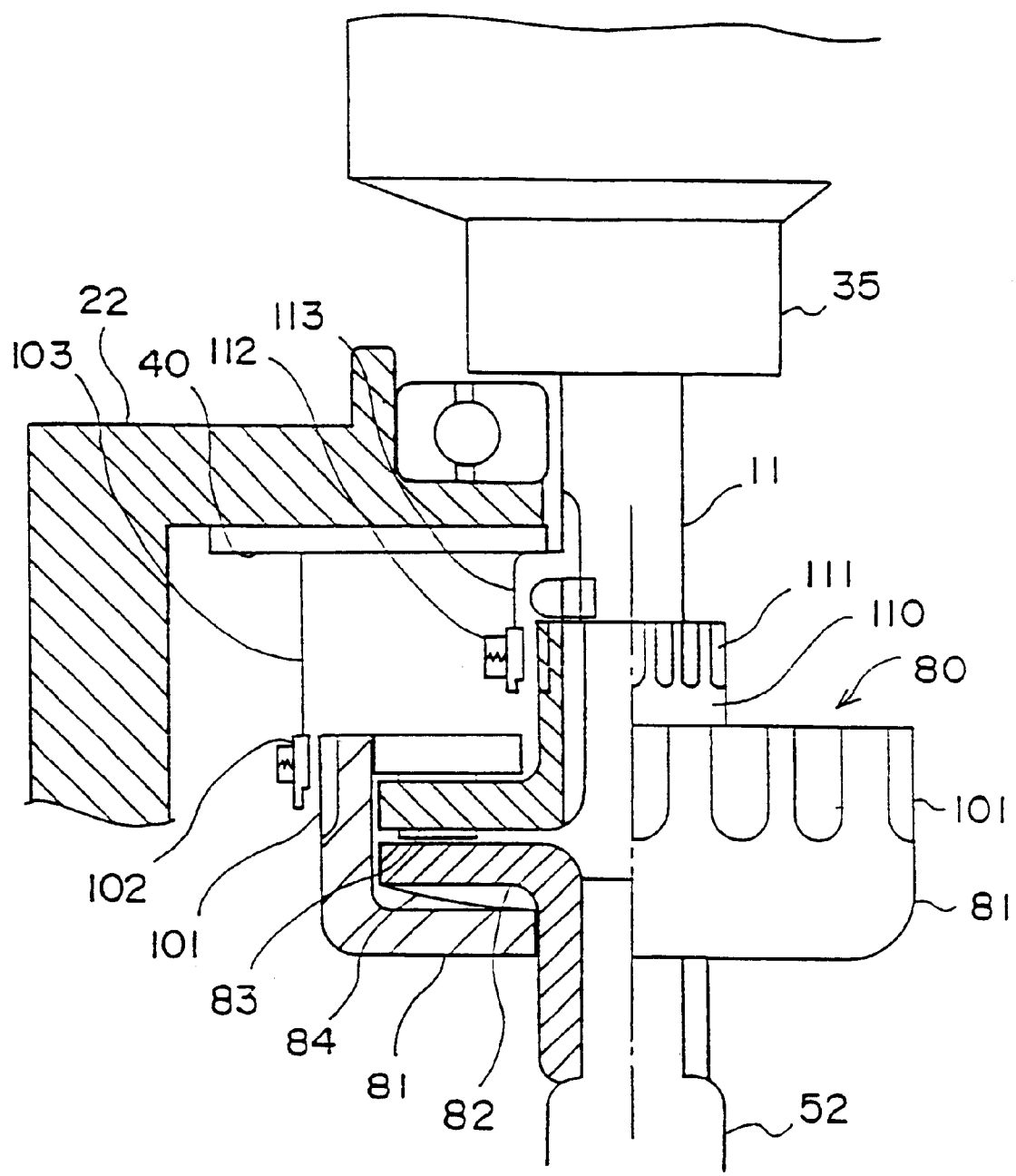
FIG. 11 is a diagram showing a torque limiter according to a second embodiment of this invention.

FIG. 11 shows a second embodiment of this invention.

Figure 7:
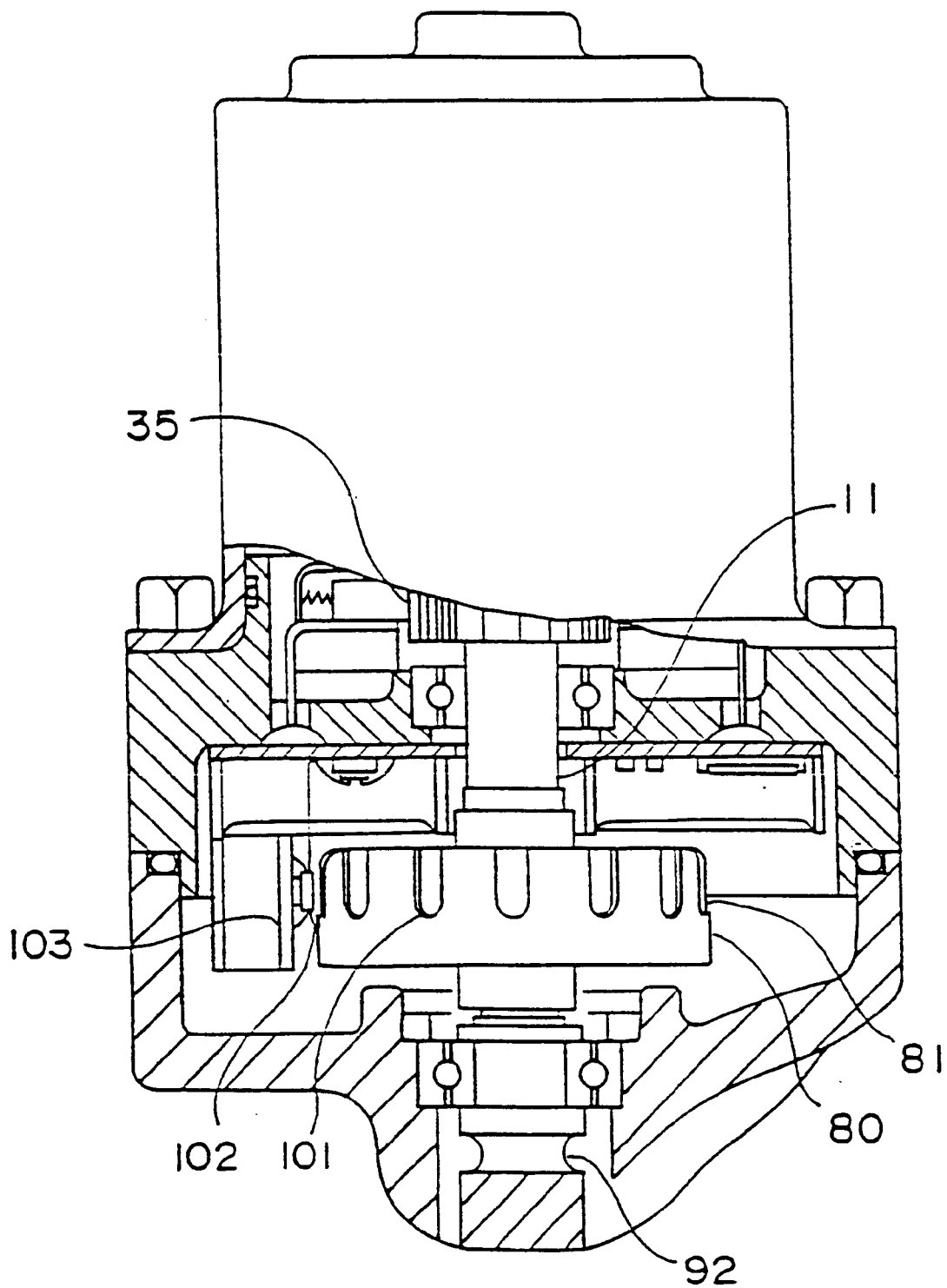
FIG. 7 is a longitudinal sectional view of the electric motor according to this invention.

According to this embodiment, the torque limiter 80 is arranged upside down from that of FIGS. 2 and 7, and its case is arranged to rotate together with the worm shaft 92. The motor is further provided with a sensor for detecting the number of revolutions of the output shaft 11. As a result, the difference in the number of revolutions between the output shaft 11 and the worm shaft 92 can be detected to assess a slipping state in-between.

In the torque limiter 80 arranged as shown in FIG. 11, more specifically, the lower clutch disc 83 (as located on the upper side in this case) is fixed on the output shaft 11 whereas the upper clutch disc 82 (as located on the lower side in this case) is fixed on the worm shaft 92, and the case 81 having the slits 101 is rotated together with the upper clutch disc 82, i.e., the worm shaft 92. As the sensor for detecting the number of revolutions of the output shaft 11, there is provided a HALLIC 112 for detecting the positions of a plurality of splines 111 formed in a joint 110 of the lower clutch disc 83 to the output shaft 11. Here, the HALLIC 112 is attached to an extension 113 of the circuit board 40 to reduce the number of wiring steps.

From the detections per unit time of the splines 111 by the HALLIC 102 the detection of the splines 111 by the HALLIC 112, the numbers of revolutions of the worm shaft 92 and the output shaft 11 are respectively detected. In this case, the slits 101 and the splines 111 need not be arranged neither in phase nor in the same number, because what is necessary is the individual numbers of revolutions of the worm shaft 92 and the output shaft 11.

The numbers of revolutions thus detected of the output shaft 11 and the worm shaft 92 are compared. It is determined that the output shaft 11 and the worm shaft 92 are normally operating without any slip, if these two shafts have the same number of revolutions. If the number of revolutions of the output shaft 11 is larger than that of the worm shaft 92, on the other hand, it is determined that the feed current to the electric motor 10 is so excessive as to cause the slip. If the number of revolutions of the worm shaft 92 is larger than that of the output shaft 11, it is determined that the slip is caused by the external force applied to the steered member (or tires). On the basis of these decisions, the control circuit of the circuit board 40 controls the electric current to be fed to the electric motor body 10A.

Figure 12:
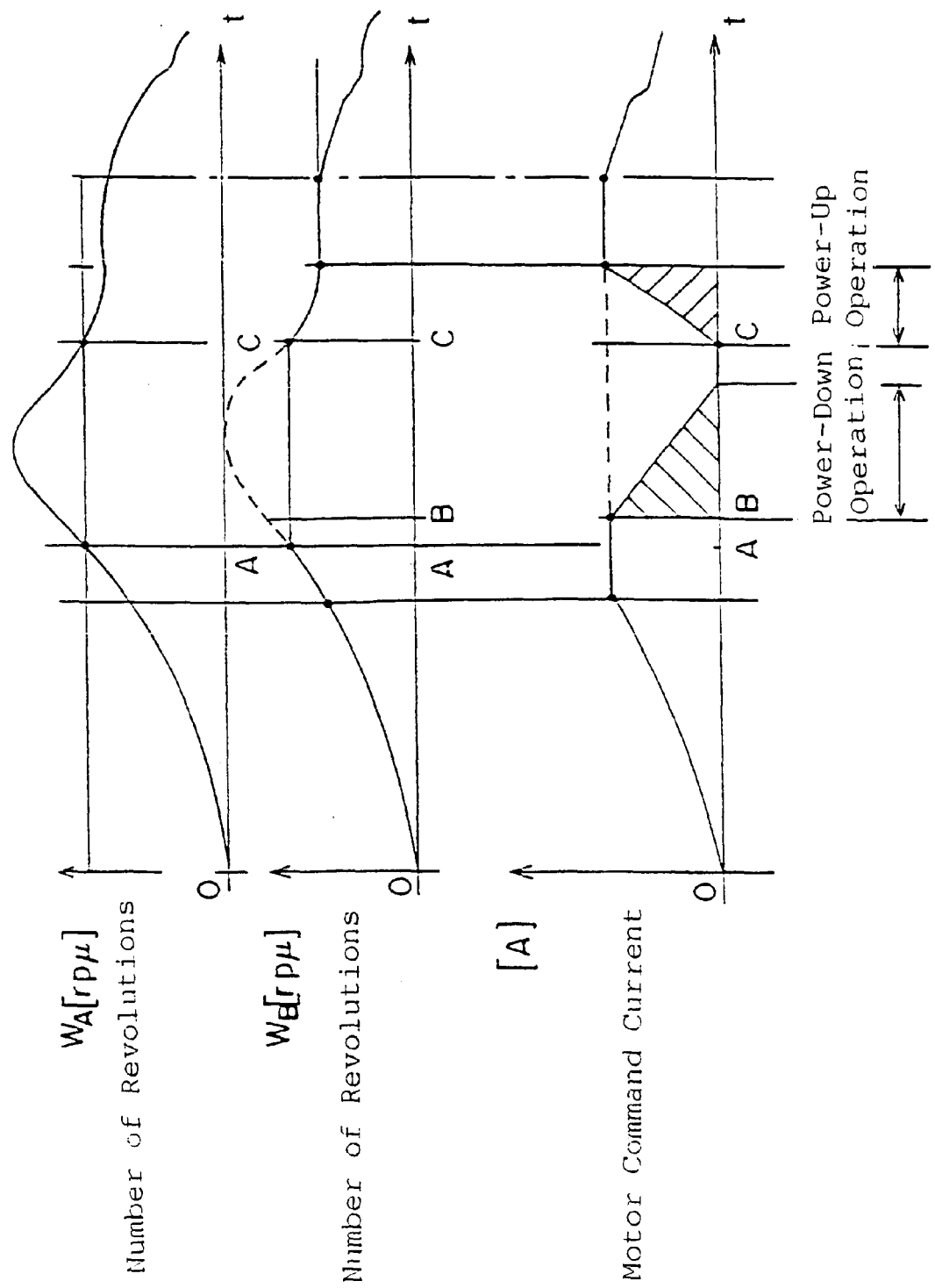
FIG. 12 is timing charts illustrating a method of controlling the motor command current against the number of revolutions WA of an output shaft and the number of revolutions WB of a worm shaft, according to the second embodiment of this invention.

When the number of revolutions WA of the output shaft 11 changes so highly as illustrated in the first graph in FIG. 12, the number of revolutions WB of the worm shaft 92, as illustrated in the second graph reaches a limit value determined by the torque limiter 80 at a time A. After the time A, the number WB does not follow the number WA of the output shaft 11, as indicated by a dotted line, but stays at a constant maximum so that the slip is continued between the output shaft 11 and the worm shaft 92. This difference in the number of revolutions between the output shaft 11 and the worm shaft 92 is detected at a time B after a predetermined detection time has passed, and it is determined that the feed current to the electric motor 10 is excessive. Then, the control circuit reduces (for the power-down operation) the feed current to the electric motor 10, to 0 A, for example, thereby to reduce the number of revolutions WA of the output shaft 11. As a result, the output shaft 11 and the worm shaft 92 again rotates together at a time C when the number of revolutions WA of the output shaft 11 becomes no more than the limit value of the worm shaft 92. After the speed difference between the output shaft 11 and the worm shaft 92 thus disappears, the feed current to the electric motor 10 is augmented again (for the power-up operation). In this embodiment, the feed current to the electric motor 10 is reduced to 0 A in the power-down operation, but this reduction value can be selected to an arbitrary value such as one half, one third or the like of the feed current at the time when the number of revolutions WB of the worm shaft 92 reaches the limit value.

Figure 13:
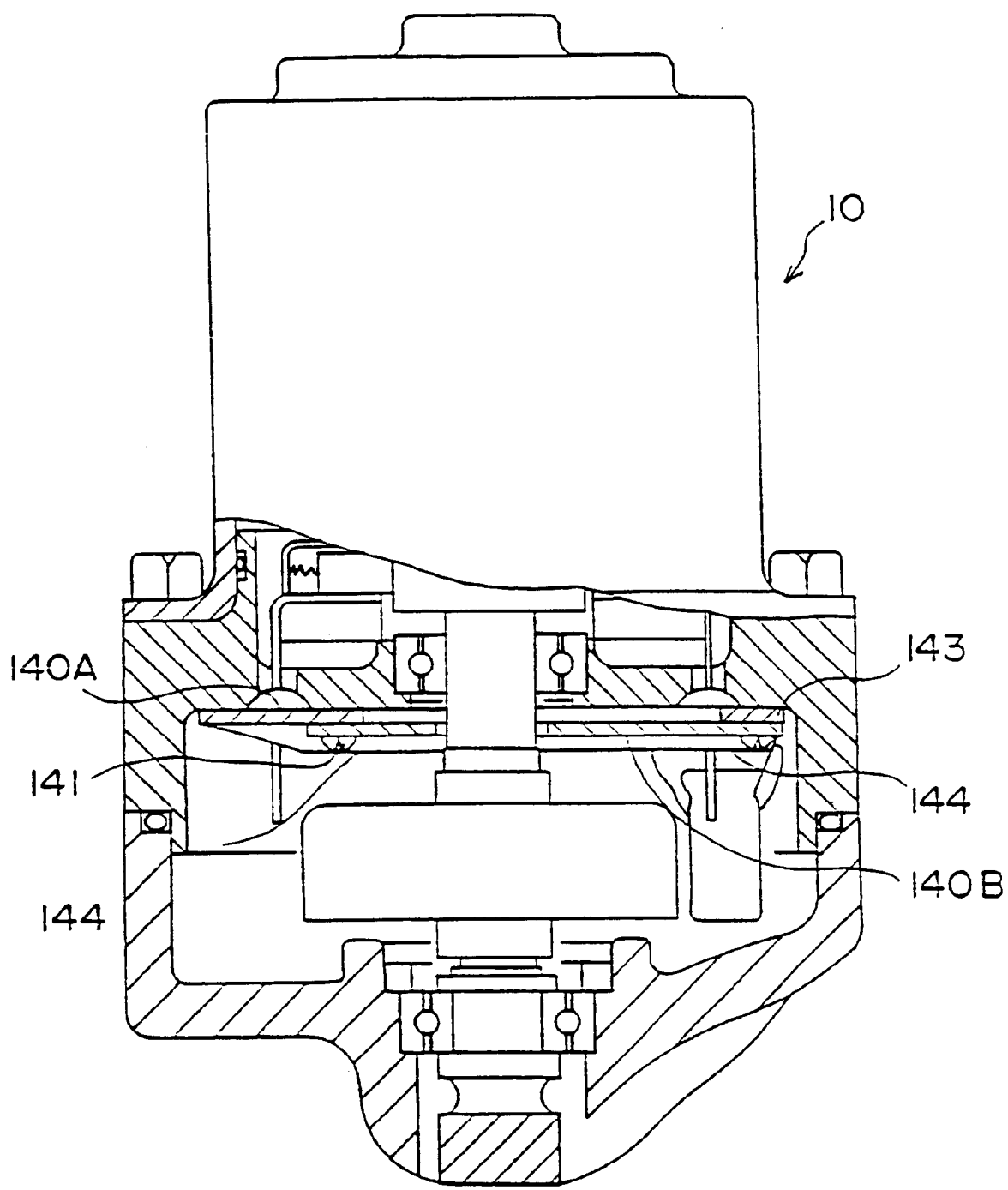
FIG. 13 is a longitudinal sectional view of an electric motor according to a third embodiment of the invention.
Figure 14:
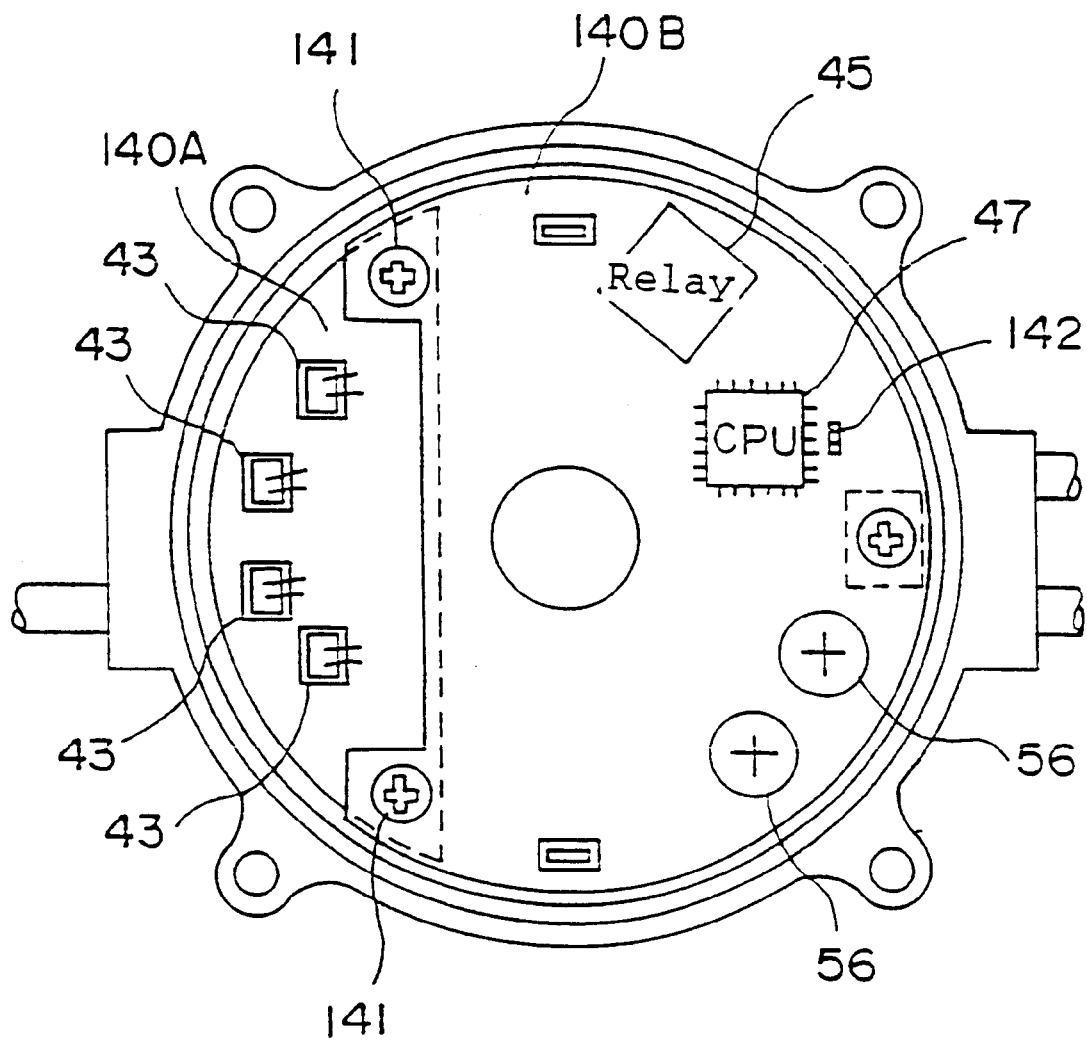
FIG. 14 is a plan view of a circuit board of the electric motor according to the third embodiment of this invention.
Figure 15:
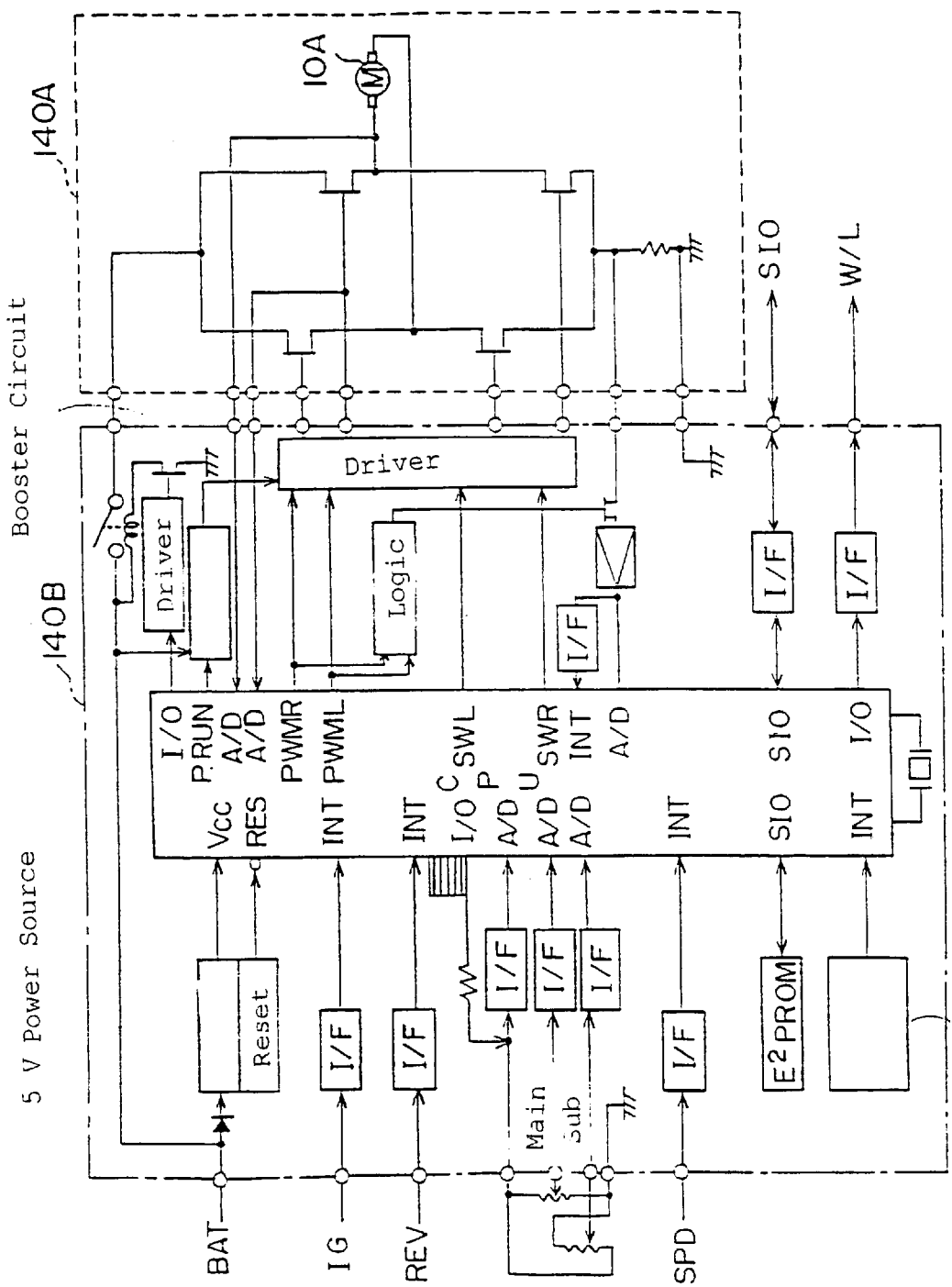
FIG. 15 is a circuit diagram of a drive circuit and a control circuit for the electric motor according to the third embodiment of the invention.

FIGS. 13 to 15 a third embodiment of this invention.

In this embodiment, the circuit board 40 in the embodiment of FIG. 2 is given a two-board structure composed of two boards 140A and 140B. Of these two, the board 140A is made of a material such as aluminum having a high thermal conductivity, and the drive circuit 41 composed of the plurality of FETs 43 is formed on this board 140A, as shown in FIGS. 14 and 15. The board 140B made of a high heat-resistant resin is fastened to the board 140A by means of screws 141, and the control circuit 42 composed of the CPU 47, the relay 45, the capacitor 56 and so on are fitted to the board 140B. A temperature sensor 142 is mounted adjacent to the CPU 47. When the temperature of the vicinity of the board comes close to a predetermined upper limit temperature of the FETs 43, the CPU 47 interrupts the power supply to the electric motor body 10A through the relay 45. A spacer 143 is fitted on the step between the board 140A and the board 140B, and the surfaces of the boards 140A and 140B are covered with a sealing agent 144.

Thus, the circuit board is composed of the two boards 140A and 140B, and the board 140A having the highly exothermic FETs 43 mounted thereon is exclusively made of an aluminum board having a higher heat releasing property than that of the board 140B, so that the cost for the whole board can be lowered. In addition, the cost can be further lowered because the cover 58 in the embodiment of FIG. 2 is omitted.

Figure 16:
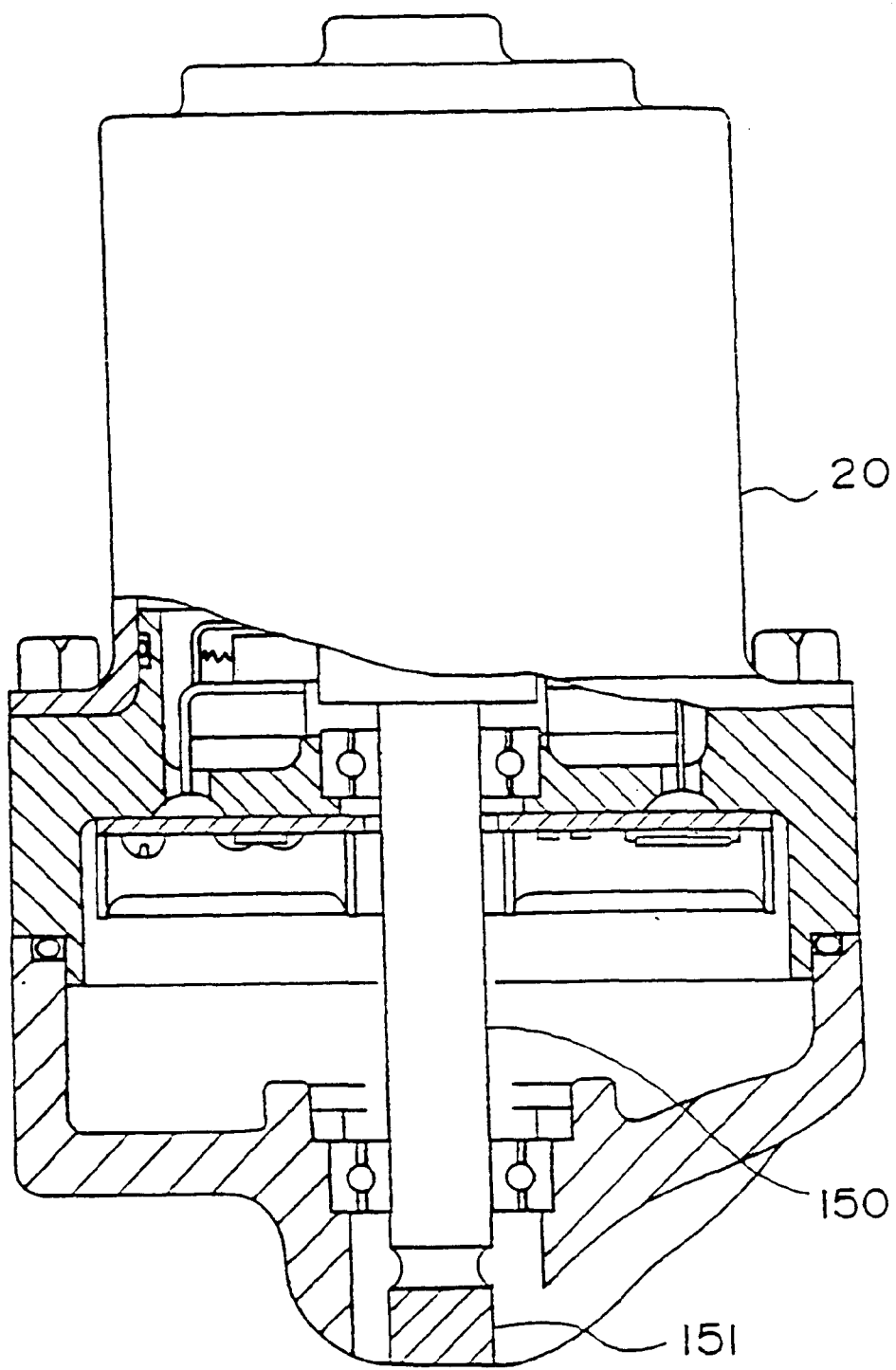
FIG. 16 is a longitudinal sectional view of an electric motor according to a fourth embodiment of the invention.

FIG. 16 is a diagram showing a fourth embodiment of the invention.

In this embodiment, the output shaft 11 and the worm shaft 92 in the embodiment of FIG. 2 are integrated into an output shaft 150 which is equipped with a worm 151 outside of the motor case 20.

Figure 17:
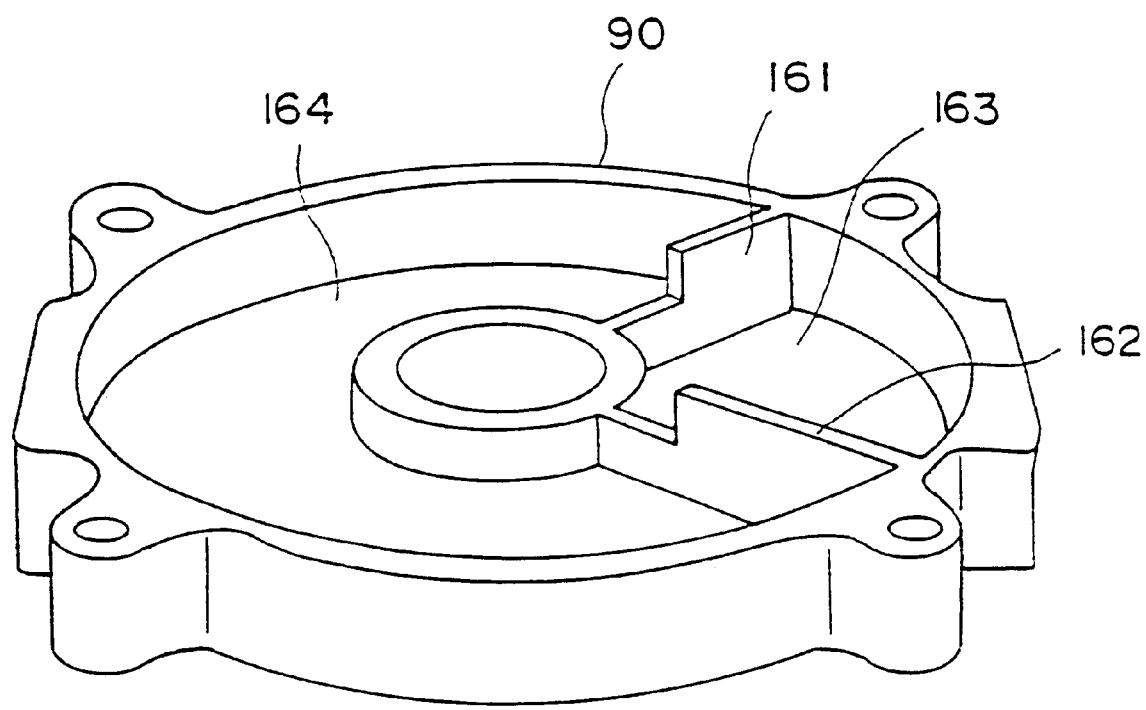
FIG. 17 is perspective view of a worm case and ribs formed thereon according to a fifth embodiment of the invention.
Figure 18:
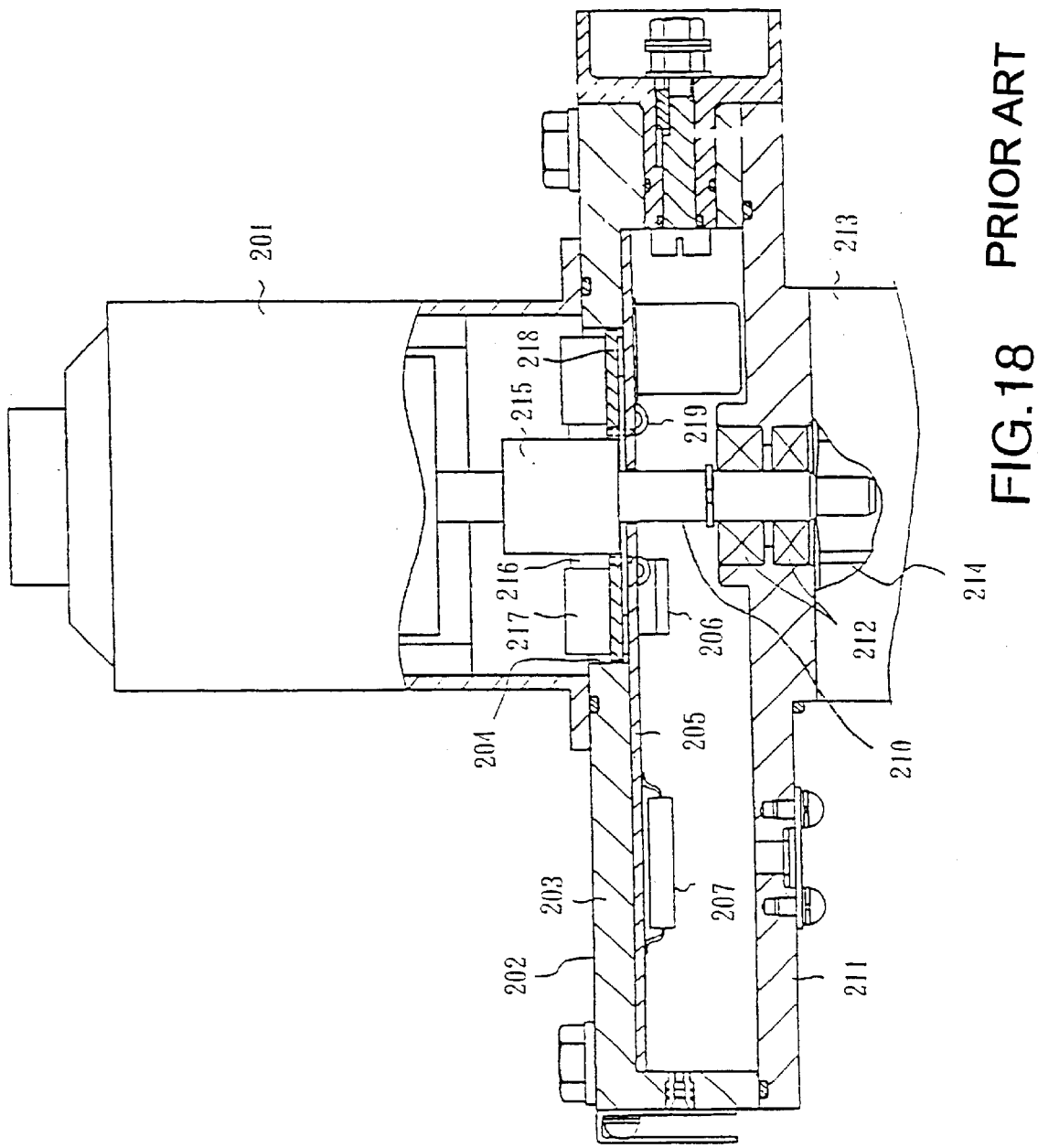
FIG. 18 is a longitudinal sectional view of an electric motor and a board case in a power steering system according to the prior art.

In FIG. 17, there is shown a fifth embodiment in which the worm case (or the lower case) 90 is equipped with a pair of field shielding ribs 161 and 162. As shown, the paired ribs 161 and 162 extending radially of the worm side case 90 form a region 163 having a sector shaped section. When this worm case 90 is mounted on the bottom of the board case 22, the plurality of FETs 43 are accommodated in that region 163. As a result, the control circuit 43 to be arranged in a region 164 is shielded from the region 163 accommodating the FETs 43 so that the control circuit 43 is free from the influences of noises accompanying the switching actions of the FETs 43.

In this embodiment, the ribs 161 and 162 covering the FETs 43 are formed in the worm case 90 but may be formed in the board case 22.

INDUSTRIAL APPLICABILITY

As has been described hereinabove, the electric motor according to this invention is useful as an electric motor for a power steering system and is suited especially for improving the heat releasing property from the circuit board of the electric motor and for reducing the size of the portions relating to the electric motor of the power steering system.

What is claimed is:

1. An electric motor for an electric power steering system for applying an assisting force to a member to be steered, in accordance with an input torque inputted to an input member, comprising:
    a motor case;
    an electric motor body accommodated within said motor case;
    a circuit board disposed within said motor case, said circuit board having a drive circuit installed thereon for driving said electric motor body, said circuit board further having a control circuit installed thereon for controlling said drive circuit;
    a board mounting member formed across an inner space of said motor case as a wall partitioning said electric motor body and said circuit board, said board mounting member being made of a material having a high thermal conductivity and supporting a bearing of an output shaft of said electric motor body, which projects through said board mounting member toward said circuit board;
    a lower case covering a lower side of said circuit board; and
    a torque limiter interposed between the output shaft of said electric motor body and a rotary shaft associated with said member to be steered, said torque limiter being accommodated in said lower case below said circuit board.

2. An electric motor for an electric power steering system as set forth in claim 1, wherein said torque limiter, the output shaft of said electric motor body and said rotary shaft are connected so that the outer circumference of said torque limiter rotates together with said output shaft, the electric motor further comprises a plurality of slits formed in the outer circumference of said torque limiter with the same number of and in phase with a plurality of electrodes of a commutator of said electric motor body and detection means arranged on the side of said torque limiter for detecting position changes in said slits according to the rotation of said output shaft, and a command value of a feed current to said electric motor body is corrected on the basis of the position changes in said slits.

3. An electric motor for an electric power steering system as set forth in claim 2, wherein said detection means extends downward from said circuit board to the side of said torque limiter.

4. An electric motor for an electric power steering system as set forth in claim 1, wherein said torque limiter, the output shaft and said rotary shaft are connected so that the outer circumference of said torque limiter rotates together with said rotary shaft, said electric motor further comprises a plurality of slits formed in the outer circumference of said torque limiter, detection means arranged on the side of said torque limiter for detecting a rotation speed of said rotary shaft via the position changes in said slits, and detection means for detecting the rotation speed of said output shaft, and a slip between said output shaft and said rotary shaft is determined in terms of an inconsistency between the detected rotating speed of said rotary shaft and the detected rotating speed of said output shaft.

5. An electric motor for an electric power steering system as set forth in claim 4, wherein a feed current to said electric motor body is reduced, when the detected rotating speed of said output shaft is higher than that of said rotary shaft, whereas the feed current to said electric motor body is gradually increased when the rotating speed of said output shaft, as detected again, is coincident with that of said rotary shaft.

6. An electric motor for an electric power steering system as set forth in claim 4, wherein a detecting member of said detection means for detecting the rotating speed of said rotary shaft extends downward from said circuit board to the side of said torque limiter.

7. An electric motor for an electric power steering system for applying an assisting force to a member to be steered, in accordance with an input torque inputted to an input member, comprising:
    a motor case;
    an electric motor body accommodated within said motor case;
    a circuit board disposed within said motor case, said circuit board having a drive circuit installed thereon for driving said electric motor body, said circuit board further having a control circuit installed thereon for controlling said drive circuit;
    a board mounting member formed across an inner space of said motor case as a wall partitioning said electric motor body and said circuit board, said board mounting member being made of a material having a high thermal conductivity and supporting a bearing of an output shaft of said electric motor body, which projects through said board mounting member toward said circuit board;
    a brush lead extending from a brush in sliding contact with a commutator of said electric motor body to said circuit board through said board mounting member, said brush lead having a wide surface area on the side of said brush;
    an ECU lead extending from said circuit board and connected electrically with said brush lead; and
    a lead wire extending from said brush and welded to a part corresponding to the wide surface area of said brush lead.

8. An electric motor for an electric power steering system as set forth in claim 7, wherein said brush lead and said ECU lead are retained together at a predetermined position by a conductive fixing spring.

9. An electric motor for an electric power steering system as set forth in claim 7, wherein said drive circuit comprises a plurality of field effect transistors, said circuit board is composed of two boards, one of which is a heat releasing board made of a material having a high thermal conductivity, and said plurality of field effect transistors are mounted on said heat releasing board.

10. An electric motor for an electric power steering system as set forth in claim 7, wherein said drive circuit comprises a plurality of field effect transistors as switching elements, said electric motor comprises a lower case for covering the lower side of said circuit board, and said lower case has ribs for enclosing said plurality of field effect transistors.

11. An electric motor for an electric power steering system as set forth in claim 7, wherein said drive circuit comprises a plurality of field effect transistors as switching elements, and said motor case has ribs for enclosing said plurality of field effect transistors.

* * * * *